(12) United States Patent
Oki et al.

(10) Patent No.: US 10,401,585 B1
(45) Date of Patent: Sep. 3, 2019

(54) BRACKET AND OPTICAL UNIT WITH BRACKET

(71) Applicants: SUMITOMO ELECTRIC INDUSTRIES, LTD., Osaka-shi, Osaka (JP); Japan Communication Accessories Manufacturing Co., Ltd., Komaki-shi, Aichi (JP); SUMITOMO ELECTRIC LIGHTWAVE CORP., Raleigh, NC (US)

(72) Inventors: Eisuke Oki, Komaki (JP); Shinsuke Sato, Komaki (JP); Hisahiko Narukawa, Komaki (JP); Takayuki Yokochi, Osaka (JP); Takashi Kondo, Raleigh, NC (US)

(73) Assignees: SUMITOMO ELECTRIC INDUSTRIES, LTD., Osaka-shi, Osaka (JP); Japan Communication Accessories Manufacturing Co., Ltd., Komaki-shi, Aichi (JP); SUMITOMO ELECTRIC LIGHTWAVE CORP., Raleigh, NC (US)

( * ) Notice: Subject to any disclaimer, the term of this patent is extended or adjusted under 35 U.S.C. 154(b) by 0 days.

(21) Appl. No.: 16/128,621

(22) Filed: Sep. 12, 2018

(51) Int. Cl.
    *G02B 6/44* (2006.01)
    *H04Q 1/02* (2006.01)
    *G02B 6/38* (2006.01)

(52) U.S. Cl.
    CPC ......... *G02B 6/4452* (2013.01); *G02B 6/3897* (2013.01); *G02B 6/4471* (2013.01); *H04Q 1/09* (2013.01)

(58) Field of Classification Search
    CPC ....... G02B 6/4452; G02B 6/4471; H04Q 1/09
    See application file for complete search history.

(56) References Cited

U.S. PATENT DOCUMENTS

| | | | |
|---|---|---|---|
| 6,926,378 B2 * | 8/2005 | Greenwald | H05K 7/1421 312/223.1 |
| 9,961,995 B2 * | 5/2018 | Kam | A47B 57/485 |
| 2004/0094492 A1 * | 5/2004 | Greenwald | H05K 7/1421 211/26 |
| 2007/0104450 A1 * | 5/2007 | Phung | G02B 6/4459 385/137 |
| 2011/0249950 A1 * | 10/2011 | Chapa | G02B 6/4452 385/135 |

(Continued)

*Primary Examiner* — Sung H Pak
(74) *Attorney, Agent, or Firm* — Drinker Biddle & Reath LLP

(57) ABSTRACT

A bracket for attaching an optical unit to a rack is provided. The bracket comprises a bracket body and a fastener. The bracket body has a first wall including a first face and a second face opposite to the first face, and a protrusion extending in a direction intersecting with the first wall from the second face against the first face. The bracket body is provided with a hole penetrating through the first wall from the first face to the second face. The fastener is arranged to pass through the hole on the first wall and is configured to be rotatable with respect to the first wall. The fastener has a first hook including a holding surface substantially parallel to the second face. The holding surface of the first hook faces the second face to define a first gap between the holding surface and the second face of the first wall at least when the fastener rotates from an initial position to a first locking position.

11 Claims, 11 Drawing Sheets

(56) References Cited

U.S. PATENT DOCUMENTS

2015/0016796 A1* 1/2015 Chatellard ............... H04Q 1/13
　　　　　　　　　　　　　　　　　　　　　385/135
2017/0010432 A1　1/2017　Xu et al.

* cited by examiner

BRACKET AND OPTICAL UNIT WITH BRACKET

TECHNICAL FIELD

The present disclosure relates to a bracket and an optical unit with a bracket.

BACKGROUND

US Patent Application Publication No. US2017/0010432 discloses a fiber module rack system. In this system, a pair of L-shaped brackets are attached on both ends of an optical unit in which a plurality of optic cassettes are mounted, and the optical unit is fixed to by fastening these brackets to the rack with screws.

SUMMARY

The present disclosure provides a bracket for attaching an optical unit to a rack. The bracket comprises a bracket body and a fastener. The bracket body has a first wall including a first face and a second face opposite to the first face, and a protrusion extending in a direction intersecting with the first wall from the second face against the first face. The bracket body is provided with a hole penetrating through the first wall from the first face to the second face. The fastener is arranged to pass through the hole on the first wall and is configured to be rotatable with respect to the first wall. The fastener has a first hook including a holding surface substantially parallel to the second face. The holding surface of the first hook faces the second face to define a first gap between the holding surface and the second face of the first wall at least when the fastener rotates from an initial position to a first locking position.

DETAILED DESCRIPTION

Problem Solved by Disclosure

Figure 1:
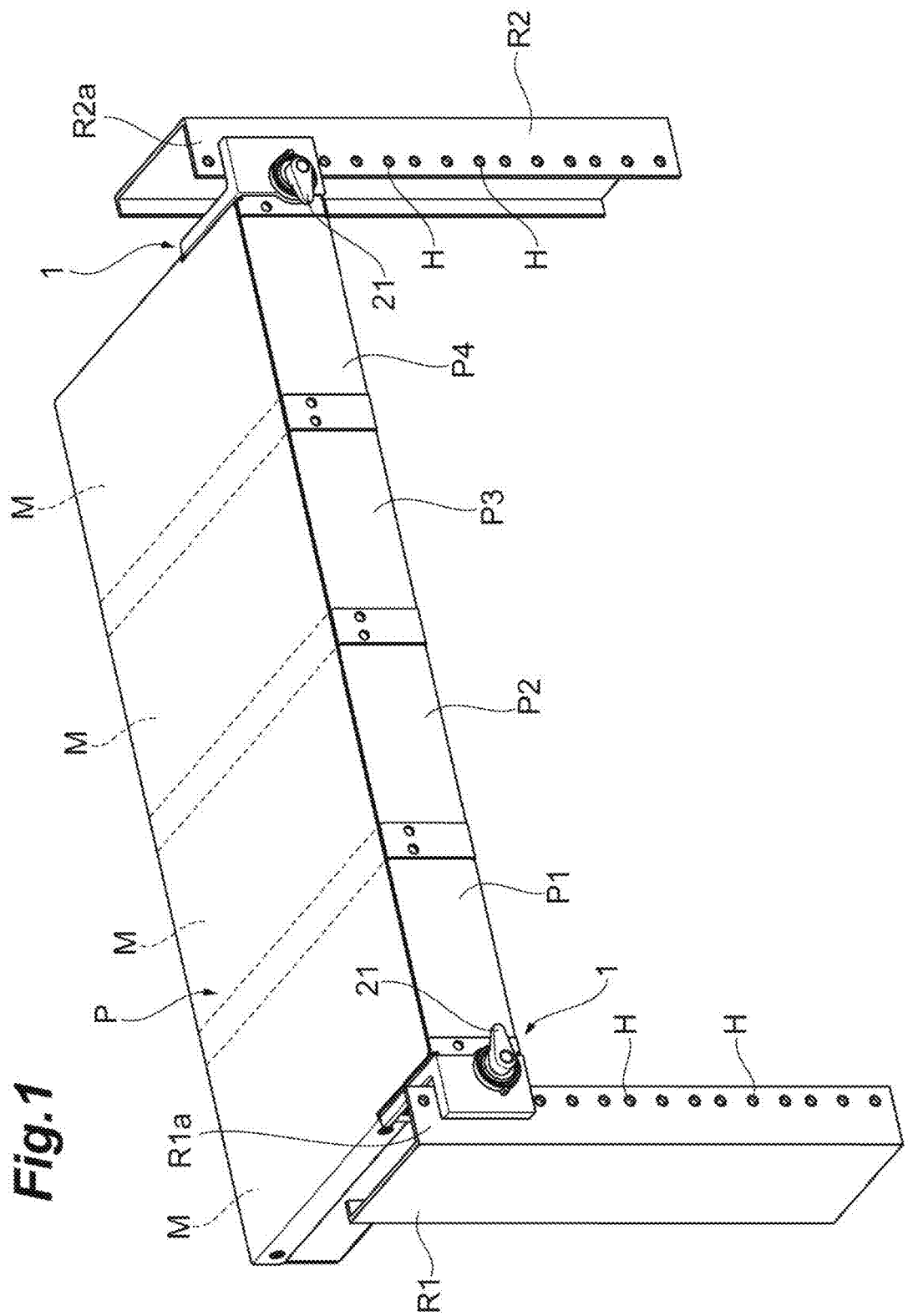
FIG. 1 is a perspective view illustrating a state where an optical unit is attached to a pair of racks with a pair of brackets (a first locking position) according to an embodiment.

The optical unit disclosed in US2017/0010432 is fixed to the rack by attaching the bracket to the rack with screws or the like, the bracket being fixed to the optical unit. However, if the number of the optical units to be attached increases, work of fastening with the screws needs to be made for the number of optical units, and therefore, attaching work takes time and trouble. Then, it is desired to provide means for further facilitating attachment of the optical unit to the rack.

According to this disclosure, it is possible to more easily attach the optical unit to the rack.

First, embodiments according to the disclosures are described in series. A bracket according to an embodiment of the disclosure is a bracket for attaching an optical unit to a rack, and includes a bracket body and a fastener. The bracket body has a first wall including a first face and a second face opposite to the first face, and a protrusion extending in a direction intersecting with the first wall from the second face against the first face. The bracket body is provided with a hole penetrating through the first wall from the first face to the second face. The fastener is arranged to pass through the hole on the first wall and is configured to be rotatable with respect to the first wall. The fastener has a first hook including a holding surface substantially parallel to the second face. The holding surface of the first hook faces the second face to define a first gap between the holding surface and the second face of the first wall at least when the fastener rotates from an initial position to a first locking position.

The bracket is provided with the protrusion which is inserted into a hole provided to the rack to temporarily fix the optical unit to the rack, and the second face of the first wall of the bracket body and the holding surface of the first hook of the fastener, the second face and the holding surface being capable of gripping and fixing a front plate (angle) of the rack therebetween. Then, according to the bracket, the front plate (angle) of the rack can be easily gripped between the second face and the holding surface by inserting the protrusion into the hole of the rack and thereafter, rotating the fastener from the initial position to the first locking position. According to the bracket, without the need to attach the bracket to the rack by fastening with the screw or the like, the optical unit can be attached to the rack with easy operational rotating operation and the like, and therefore, a time taken for the attaching work can be reduced. Moreover, it is possible to more easily attach the optical unit to the rack. Here, the "initial position" refers to a position before the optical unit is fixed (rotated) to the rack by the fastener, and the "first locking position" refers to a position when the optical unit is fixed by the rotated fastener to the rack which has a first plate thickness.

As one embodiment, the fastener may have a handle which is provided adjacent to the first face of the first wall and configured to rotate the fastener. The rotating operation of the fastener can be easily made by the fastener having the handle. The bracket may further comprise an elastic member arranged between the handle and the bracket body. By providing the elastic member, a biasing force can be provided to the grip of the rack by the second face and the holding surface, which allows the optical panel to be more reliably fixed to the rack.

As one embodiment, the fastener may have a first rotating member having a handle configured to rotate the fastener and provided adjacent to the first face, and a second rotating member having the first hook and provided adjacent to the second face. The first rotating member is attached to the second rotating member such that the first rotating member and the second rotating member integrally rotate. By configuring the fastener with different members such as the first rotating member and the second rotating member, the attachment configuration of the fastener to the bracket body can be simplified.

As one embodiment, the fastener may further have a second hook including a holding surface substantially parallel to the second face, and the second hook is provided at a position different from the first hook in a direction along a rotation axis of the fastener. The holding surface of the second hook may face the second face to define a second gap between the holding surface of the second hook and the second face of the first wall at least when the fastener rotates from an initial position to a second fastening position. By the first hook and the second hook provided at the different positions, the bracket can correspond to front plates (angles) of the panels having different plate thicknesses. In this case, a length of the first gap may be shorter than a length of the second gap in the direction along the rotation axis. Here, a "second locking position" refers to a position when the optical unit is fixed by the rotated fastener to the rack which has a second plate thickness. The second plate thickness may be different from or thicker than the first plate thickness.

As one embodiment, in a case where the fastener has the first hook and the second hook, the fastener may further have a cylindrical portion, the first hook and the second hook being provided on an outer periphery of the cylindrical portion. The first hook member and the second hook member may be arranged opposite to each other in a circumferential direction of the cylindrical portion. In this case, for example, an operation method can be easily achieved such as that the fastener is rotated to a first rotation direction in a case where the bracket is fixed to a rack having a first plate thickness, and the fastener is rotated inversely to a second rotation direction in a case where the bracket is fixed to a rack having a second plate thickness, which can provide an intuitive operation.

As one embodiment, in a case where the fastener has the first hook and the second hook, the bracket body may have a second wall including a structure for fixing the bracket body to the optical unit, the second wall being provided with a cutout. The second hook may be housed in the cutout when the fastener rotates from the initial position to the first locking position, or the first hook may be housed in the cutout when the fastener rotates from the initial position to the second locking position. In this case, the hook which is not used for locking on the rack can be housed, making an entire configuration of the bracket more compact.

As one embodiment, the bracket body may have a second wall including a structure for fixing the bracket body to the optical unit. The first wall may be contiguous to the second wall such that a direction of the first wall spreading intersects with a direction of the second wall spreading. In this case, since a lateral face of the optical unit can be fixed to the bracket by the second wall, fixing between the optical unit and the bracket can be made stronger.

As one embodiment, the protrusion may be provided on the first wall to be located more upward than the hole for passing the fastener therethrough. By arranging the protrusion upward like this which is inserted into the hole of the rack for temporary fastening, the bracket when temporarily fixed before fixed by the first hook or the like is unlikely to fall from the rack, further facilitating fixing the bracket to the rack.

An optical unit with bracket according to an embodiment of the disclosure comprises a bracket according to at least any one of the embodiments described above, and an optical unit having a plurality of optical fibers housed therein. The bracket body is fixed to the optical unit. According to the optical unit with bracket like this, it is possible to more easily attach the optical unit to the rack.

Detail of Embodiment of Disclosure

A description is given below of the bracket and the optical unit with bracket according to the embodiments of the disclosure referring to the drawings. The invention is not limited to the examples, and is intended to include the meanings shown by the scope of the Claims and equivalent to the scope of the Claims, and all changes in the scope thereof. In the following description, the same components in description of the drawings are designated by the same reference signs, and redundant description is omitted.

Figure 10A:
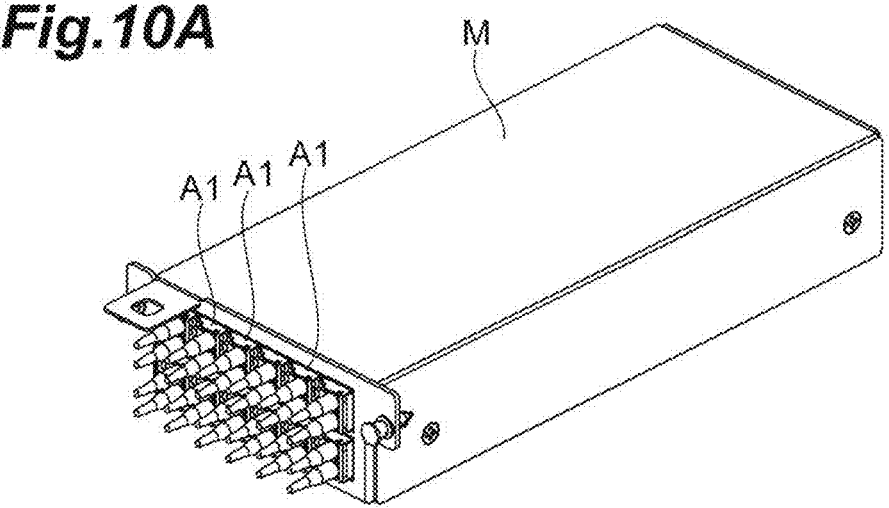
FIG. 10A is a perspective view of an optical connector module mounted in the optical panel seen from front side thereof.
Figure 10B:
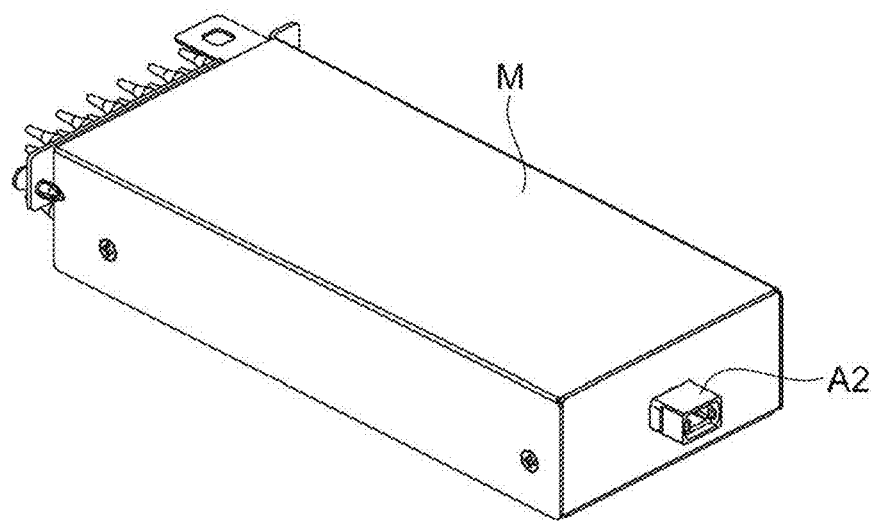
FIG. 10B is a perspective view of the optical connector module seen from a back side thereof.
Figure 10C:
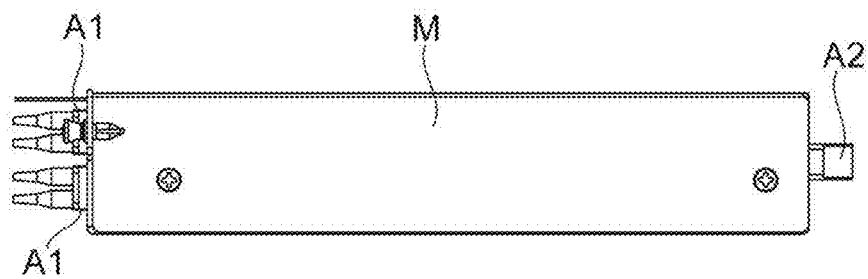
FIG. 10C is a lateral view of the optical connector module seen from a lateral side thereof.
Figure 11:
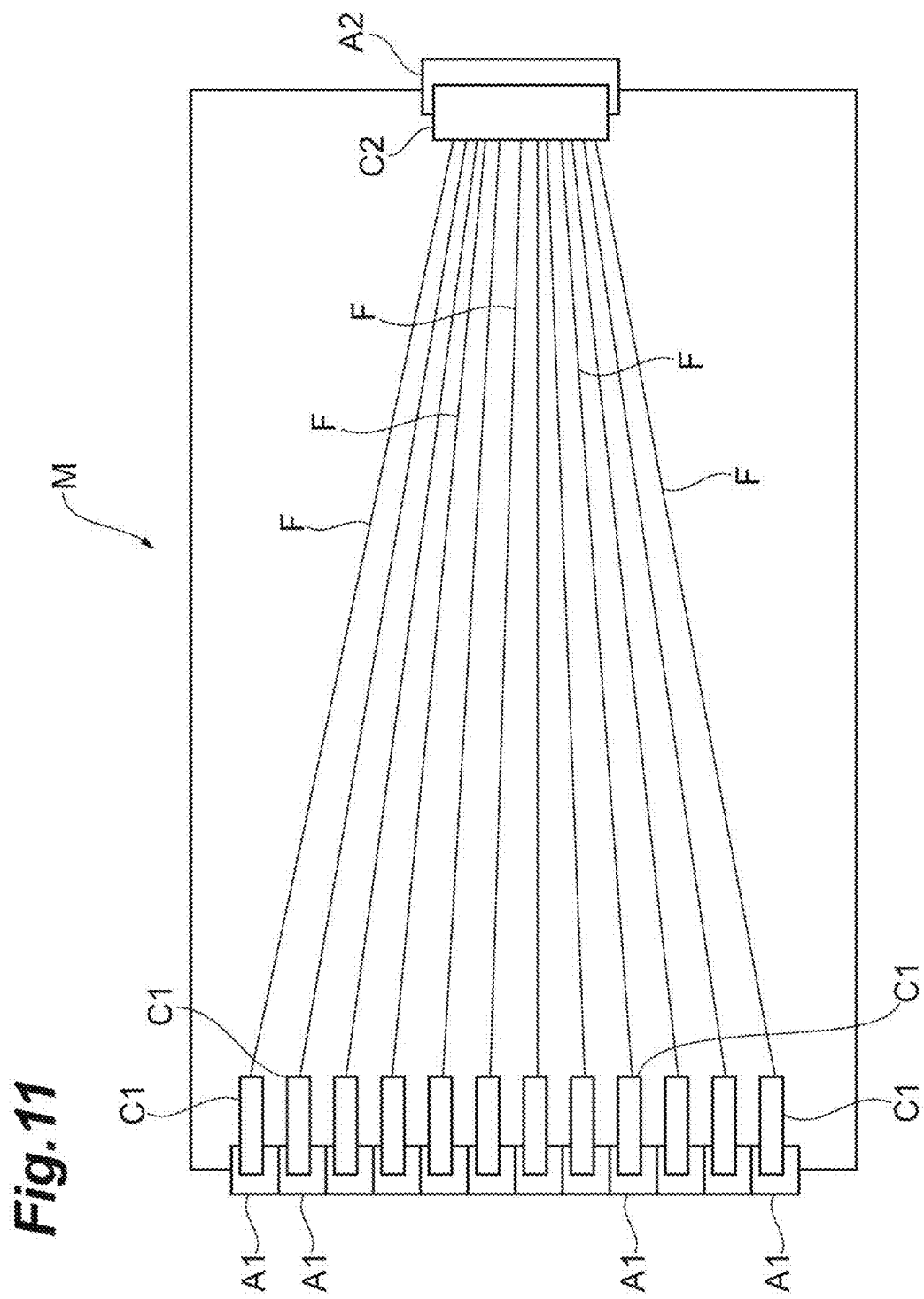
FIG. 11 is a schematic view illustrating an example of wiring inside the optical connector module.

First, a description is given of a configuration in which the optical unit is attached to a pair of racks with the brackets according to the embodiment with reference to FIG. 1. FIG. 1 is a perspective view illustrating a state where an optical unit P is attached to a pair of racks R1 and R2 with a pair of brackets according to an embodiment. The optical unit P has a plurality of optical connector modules M (see FIG. 10A to FIG. 10C and FIG. 11), for example, mounted therein, and the respective modules M are inlet through and inserted into inside of portions of windows P1 to P4. Although omitted in FIG. 1, the optical connector module M is provided with a plurality of LC adapters A1 (collectively called an LC adapter panel) on a front face, and provided with an MPO adapter A2 on a rear face. In the optical connector module M, as illustrated in FIG. 11, each of single core optical fibers F distributed from an MPO connector C2, the optical fibers F being connected inside the MPO adapter A2, is connected with the LC adapter A1 on the front side by an LC connector C1. An outside of each of the LC adapter A1 of the optical connector module M and the MPO adapter A2 is connected to a cord or cable with another LC connector and the MPO connector. In FIG. 10A to FIG. 10C, only the LC connector connected to the outside of the above LC adapter A1 is illustrated. In this way, the optical unit P has a plurality of optical fibers housed therein, and the cord extracted from a front face of a main body (a front side in the figure) and the optical cable or cord collecting a plurality of optical fibers is extracted from a rear face of the main body.

The optical unit P is configured to include a housing of a horizontally long shape, and both ends of the optical unit P are fixed to the racks R1 and R2 of a 19-inch rack (EIA standards) or the like. Angles R1a and R2a of the racks R1 and R2 are provided with a plurality of fastening holes H in series in a vertical direction. Examples of the angle of the rack include a type of a thin angle thickness (e.g., a thickness of 2.3 mm) and a type of a thick angle thickness (e.g., a thickness of 6 mm), and the racks R1 and R2 of the thin angle thickness type are illustrated in FIG. 1. In the embodiment, the optical unit P is fixed to the racks R1 and R2 with a pair of brackets 1. In FIG. 1, the configuration in which only one optical unit P is attached is disclosed, but is not limited thereto, and many optical units P can be attached to the racks R1 and R2 with the brackets 1. Although details of the bracket 1 are described later, while the bracket 1 is fixed with screws or the like to the lateral face of the optical unit P, the screws or the like are not used for attachment to the racks R1 and R2, and the optical unit P is fixed to racks R1 and R2 by way of temporary fastening via the protrusion 13 inserted into the fastening hole H (see FIG. 7B) and final fastening by gripping the angles R1a and R2a of the racks R1 and R2 through the rotating operation of a fastener S (hook 33 or the like) (see FIG. 7B).

Figure 2:
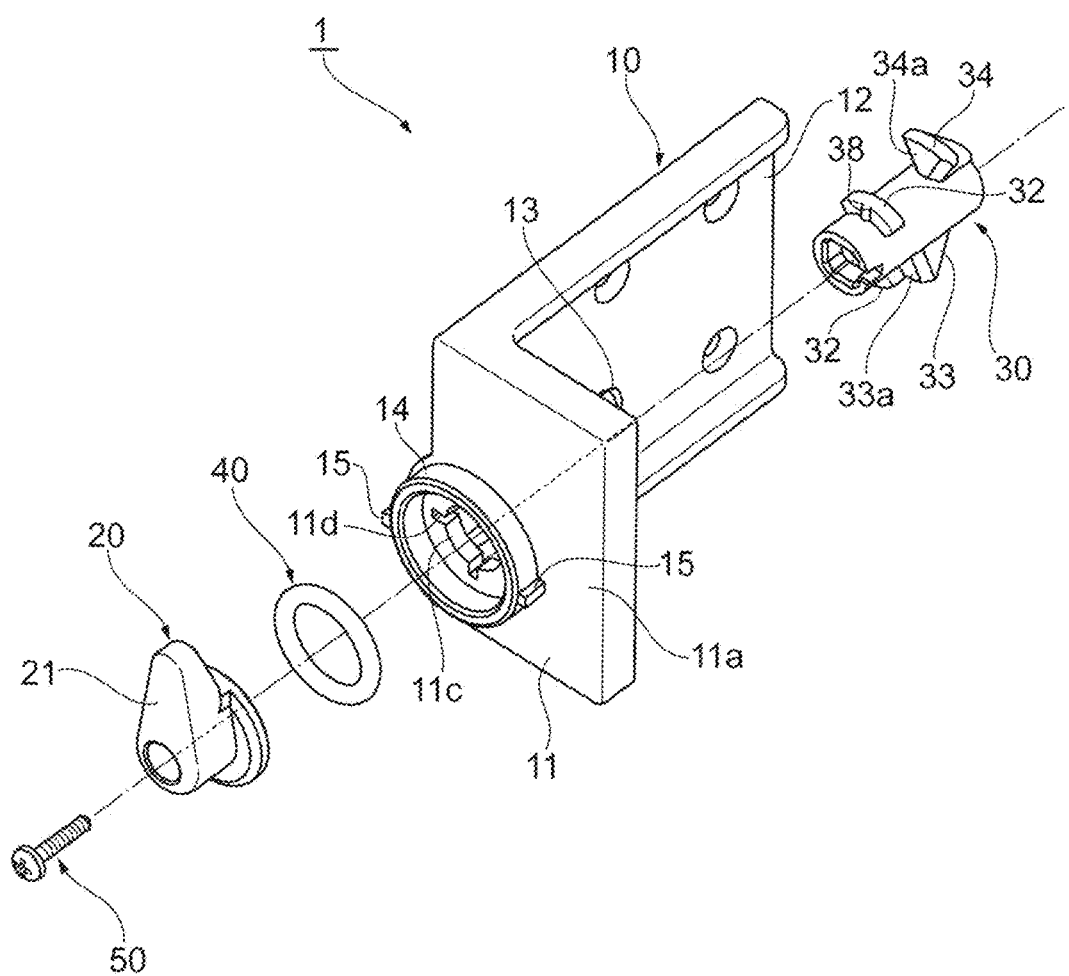
FIG. 2 is an exploded perspective view of a bracket according to an embodiment.
Figure 3:
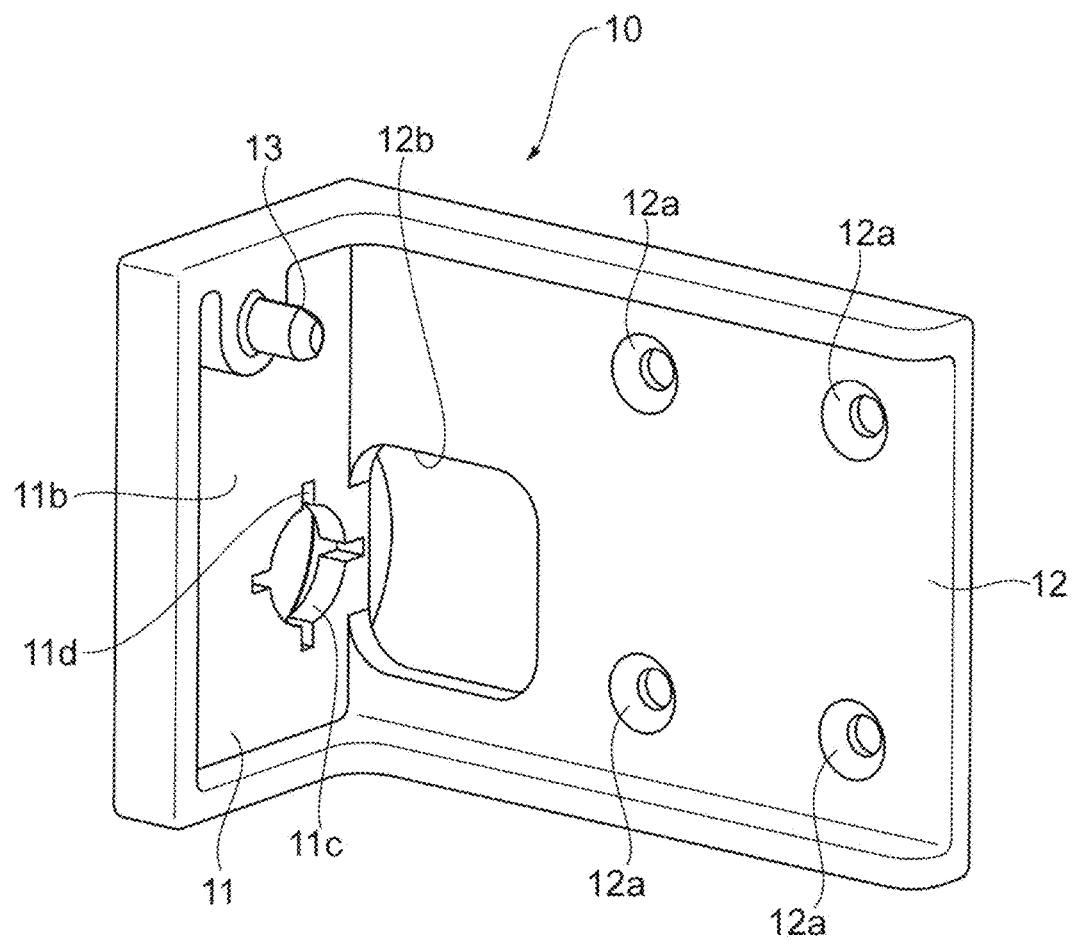
FIG. 3 is a perspective view of a bracket body seen from a back side, the bracket body being one constituent part of the bracket illustrated in FIG. 2.
Figure 4:
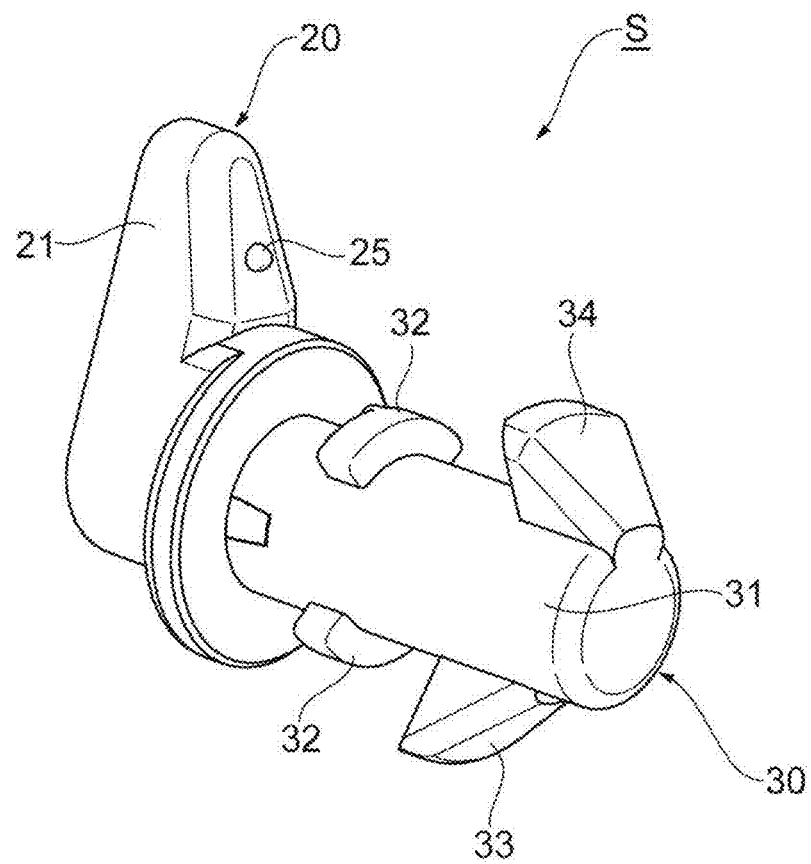
FIG. 4 is a perspective view of a fastener seen from the back side, the fastener being one constituent part of the bracket illustrated in FIG. 2.
Figure 5A:
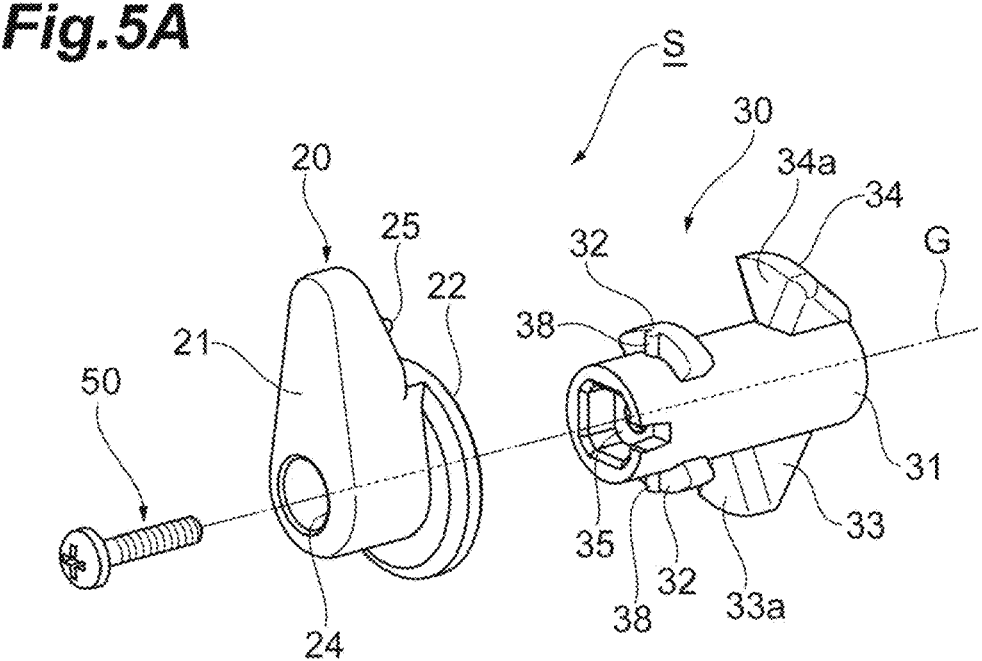
FIG. 5A is an exploded perspective view of the fastener illustrated in FIG. 4 seen the from a front side.
Figure 5B:
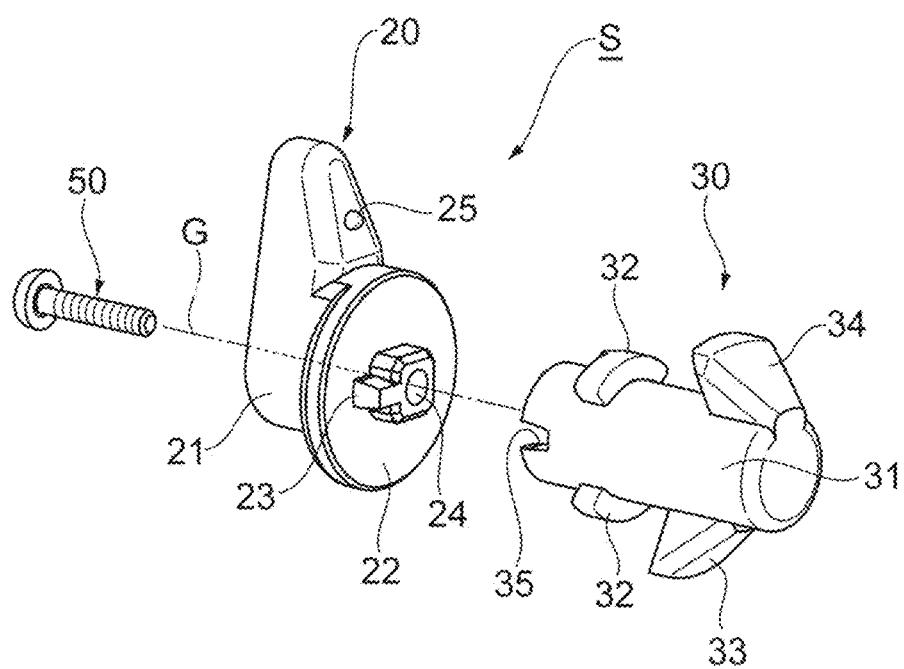
FIG. 5B is an exploded perspective view of the fastener seen from the back side.

Next, a description is given of a configuration of the bracket 1 according to the embodiment with reference to FIG. 2 to FIGS. 5A and 5B. FIG. 2 is an exploded perspective view of the bracket 1. FIG. 3 is a perspective view of a bracket body 10 seen from a back side, the bracket body 10 being one constituent part of the bracket 1. FIG. 4 is a perspective view of the fastener S seen from the back side, the fastener S being one constituent part of the bracket 1. FIG. 5A is an exploded perspective view of the fastener S seen from a front side, and FIG. 5B is an exploded perspective of the fastener S seen from the back side. Although, in FIG. 2 to FIGS. 5A and 5B, a configuration of the bracket on the right side of the brackets 1 illustrated in FIG. 1 is described, a configuration of the left bracket 1 has a right-left symmetric structure in which the left bracket 1 configuration is line-symmetric to the right bracket configuration with respect to a center line through a center in a longitudinal direction of the optical unit P, and a description of the configuration of the left bracket 1 is omitted. The bracket 1 includes the bracket body 10, the fastener S having rotating members 20 and 30, and an elastic member 40, as illustrated in FIG. 2. A screw 50 fixes the rotating members 20 and 30 to each other.

The bracket body 10 has a first wall 11 and a second wall 12 as illustrated in FIG. 2 and FIG. 3. The first wall 11 is contiguous to the second wall 12 such that a face direction in which the first wall 11 spreads is perpendicular to a face direction in which the second wall 12 spreads to define an L-like shape. The first wall 11 may be contiguous to the second wall 12 to define a T-like shape, or to intersect at an angle other than a right angle. The first wall 11 includes a front face 11a and a back face 11b opposite to the front face 11a. The first wall 11 is provided with a hole 11c penetrating through from the front face 11a to the back face 11b. The hole 11c is arranged such that the fastener S configured to include the rotating members 20 and 30 is inserted thereinto. The hole 11c is provided with four grooves 11d (0 degree/90 degrees/180 degrees/270 degrees) for adjusting the rotating operation of the fastener S (for a protrusion 38 of the rotating member 30 to fit into). The front face 11a of the first wall 11 is provided with an annular body 14 to surround a periphery of the through-hole 11c. The elastic member 40 such as an O-ring is housed in the annular body 14. In order to more reliably fix the rotating operation of the fastener S, a pair of protrusions 15 capable of engaging with a protrusion 25 which is provided inside a handle 21 of the fastener S (e.g., see FIG. 4) may be provided to a periphery of the annular body 14. A pair of protrusions 15 are provided to be mutually opposite in a circumferential direction of the annular body 14.

The back face 11b of the first wall 11 is provided with the protrusion 13 extending against the front face 11a. The protrusion 13 is a small columnar pin having a tapered tip end, and is used to serve to perform positioning corresponding to the fastening holes H of the racks R1 and R2 illustrated in FIG. 1 or prevent dropping from the racks. The protrusion 13 being inserted into the fastening hole H allows the bracket 1 to be temporarily fastened to the rack R1 or R2. The protrusion 13 is located more upward and slightly more outward than the through-hole 11c (the rack R1 or the like is positioned at this part when locking on the rack). Although the protrusion 13 may be provided more downward than the through-hole 11c (or, the through-hole 11c may be provided more upward than the protrusion 13), the configuration of providing the through-hole 11c upward allows the temporal fastening of the bracket 1 to the rack R1 or R2 to be made stable and allows a final fixing work after that to be made easy.

The second wall 12 of the bracket body 10 is provided with a plurality of holes 12a (four (2×2) holes in the embodiment as an example) for fixing the bracket body 10 to the lateral face of the optical unit P. By fastening with the screws through these holes 12a, the bracket body 10 is fixed to the optical unit P. A cutout 12b is provided on the second wall 12 closer to the first wall 11 than the holes 12a. Housed in the cutout 12b is the hook 33 or 34 provided to the rotating member 30 of the fastener S, the hook not being used for fixing to the rack R1 or R2. This allows the configuration of the bracket 1 to be made compact. The bracket body 10 having the configuration like this is formed by metal die-casting using aluminum and the like, for example. The bracket body 10 may be made of a plastic resin.

The fastener S is configured to include the rotating members 20 and 30 as illustrated in FIG. 2 and FIG. 4, and the rotating member 20 is attached to the rotating member 30 with the screw 50 such that the rotating members 20 and 30 integrally rotate. In the fastener S, the rotating member 20 provided adjacent to the front face 11a of the first wall 11 and the rotating member 30 provided adjacent to the back face 11b of the first wall 11 are inserted into the through-hole 11c provided on the first wall 11 from both sides and fastened with the screw. At this time, the elastic member 40 such as an O-ring is inserted between the rotating member 20 and the front face 11a of the first wall 11 (inner side of annular body 14). This insertion of the elastic member 40 allows the rotating member 30 fixed to the rotating member 20 to move in a minute range along an axis direction. The rotating members 20 and 30 constituting the fastener S are formed by metal die-casting using aluminum and the like, for example. The rotating members 20 and 30 may be made of a plastic resin.

The rotating member 20 includes the handle 21 for rotating the fastener S, a circular plate portion 22 bearing the rotating member 30 when attaching the rotating member 30, and a key 23 for integrally rotating with the rotating member 30 as illustrated in FIG. 4 and FIGS. 5A and 5B. The rotating member 20 is provided with a through-hole 24 therein for inserting the screw 50. The rotating member 20 is provided with the protrusion 25 for fixing the rotation of the handle 21. As described above, the protrusion 25 engages with any protrusion 15 of the bracket body 10 such that the rotation of the handle 21 is fixed.

The rotating member 30 includes a cylindrically shaped main body 31, a catching portion 32 projecting outward from the main body 31, and the hooks 33 and 34 projecting outward from the main body 31 as illustrated in FIG. 4 and FIGS. 5A and 5B. An internal thread for the screw 50 is formed in the main body 31 along the axis direction. The catching portion 32 is a portion supporting the rotating member 30 such that the rotating member 30 inserted from the back face 11b into the through-hole 11c does not go toward the front side no more. The hooks 33 and 34 are portions for gripping the angles R1a and R2a of the racks R1 and R2 between the hooks 33 and 34 and the back face 11b of the first wall 11 of the bracket 1 to finally fix the bracket 1 to the racks R1 and R2, when the fastener S rotates from the initial position to an engaging position where the optical unit is fixed to the rack. The hooks 33 and 34 respectively have the holding surfaces 33a and 34a substantially parallel to the back face 11b, and a predetermined gap is defined between the holding surface 33a or 34a and the back face 11b when the fastener S rotates from the initial position to the engaging position. The hook 34 is provided at a position different from the hook 33 in a direction along a rotation axis G of the fastener S, and more specifically, the hook 33 is provided on the more front side (closer to the first wall 11) than the hook 34. Therefore, in the rotating member 30, a length of a gap provided between the holding surface 33a of the hook 33 and the back face 11b in the direction along the rotation axis G is shorter than a length of a gap provided between the holding surface 34a of the hook 34 and the back face 11b. The angle of the rack is arranged in this predetermined gap. In other words, the length of a predetermined gap corresponds to the angle thickness, and in the embodiment, the hook 33 located frontward corresponds to the thin angle thickness type (2.3 mm) and the hook 34 located backward corresponds to the thick angle thickness type (6 mm). In this way, the example illustrated in FIG. 2 and the like can address to the rack having two or more types of angle thicknesses. The hooks 33 and 34 are arranged opposite to each other (at 180 degrees) in a circumferential direction of the cylindrically shaped main body 31. The hooks 33 and 34 are arranged at the positions the farthest from each other in the circumferential direction in this way such that in a case where one hook 33 is used for finally fixing to the racks R1 and R2, the other hook 34 does not hinder the fixing.

Figure 6A:
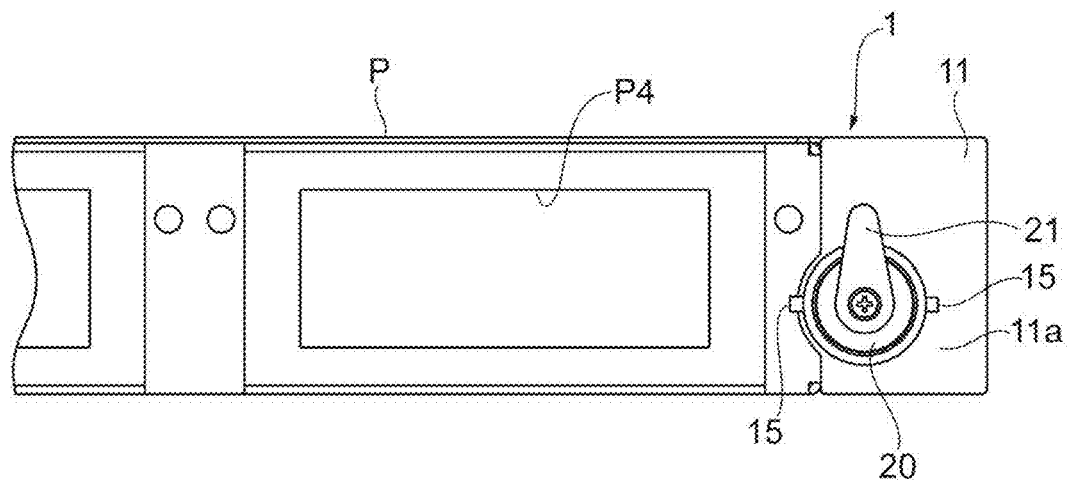
FIG. 6A is a front view illustrating a case where the bracket is in a non-locked state (initial position)
Figure 6B:
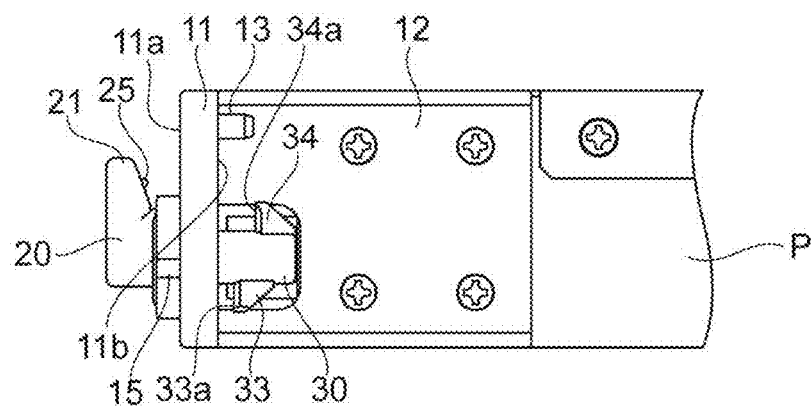
FIG. 6B is a lateral view illustrating a case where the bracket is in the non-locked state (initial position)
Figure 7A:
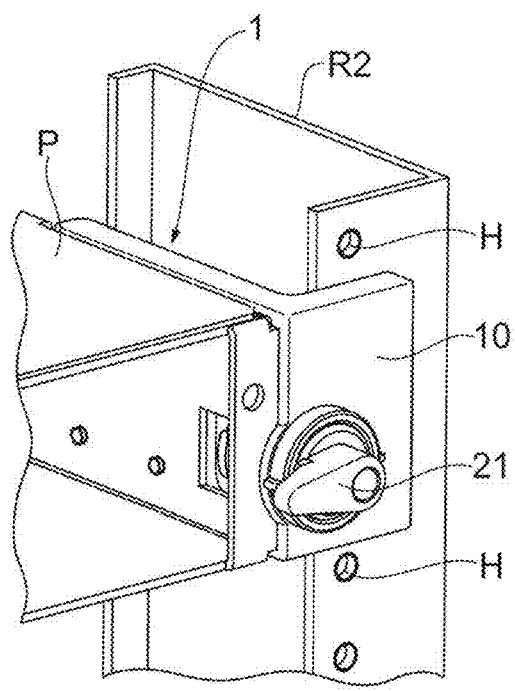
FIG. 7A is a perspective view of one end (right end) of an optical panel in a state of being attached to a rack with the bracket (the first locking position) seen from the front side.
Figure 7B:
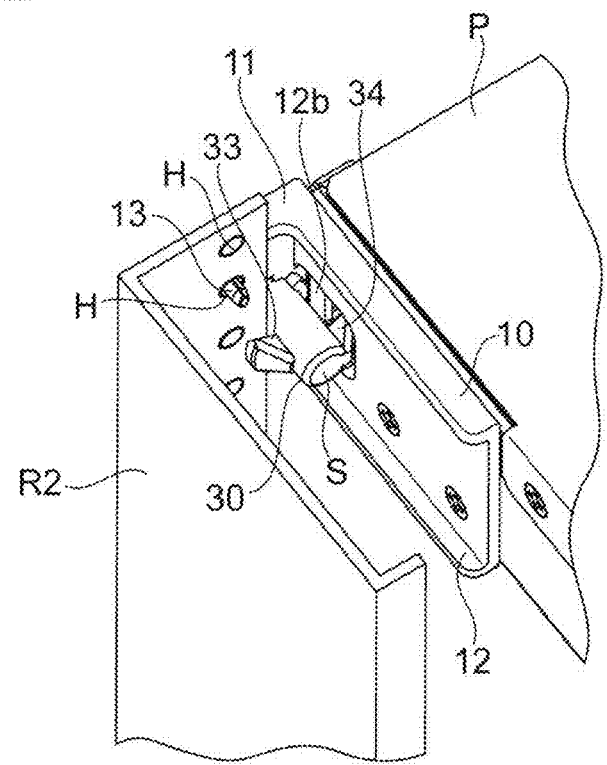
FIG. 7B is a perspective view of one end (right end) of the optical panel in the state of being attached to the rack with the bracket (the first locking position) seen from the back side.

Next, a description is given of a method for fixing one end (right end) of the optical unit P to the rack R1 with the bracket 1 having the configuration like this with reference to FIGS. 6A and 6B, and FIGS. 7A and 7B. The same method is applied to a method for fixing the other end (left end) of the optical unit P to the rack R2 with the bracket 1 having the right-left symmetric structure. FIG. 6A is a front view illustrating a case where the bracket is in a non-locked state (initial position), and FIG. 6B is a lateral view illustrating a case where the bracket is in the non-locked state (initial position). FIG. 7A is a perspective view of one end (right end) of the optical unit P in a state of being attached to the rack R1 with the bracket 1 seen from the front side, and FIG. 7B is a perspective view of one end (right end) of the optical unit in the state of being attached to the rack R1 with the bracket 1 seen from the back side.

As illustrated in FIG. 6A and FIG. 6B, at the initial position before fixing the optical unit P to the rack R1 with the bracket 1, the handle 21 of the bracket 1 is in a state that a tip end thereof is directed upward along the vertical direction, and correspondingly, the hooks 33 and 34 are also at the positions of the rotation direction in the vertical direction with respect to the main body 31. More specifically, the hook 33 for a thin plate is positioned downward and the hook 34 for a thick plate is positioned upward. Then, the protrusion 13 of the bracket 1 like this is first inserted into a predetermined fastening hole H of the rack R1 to temporarily fix the bracket 1 to the rack R1.

After completion of the temporal fixing of the bracket 1 to the rack R1, the handle 21 of the fastener S is rotated toward the inner side (toward the optical unit P) at 90°. By doing so, the rotating members 20 and 30 also rotate 90° in conjunction with a motion of the handle 21, and then, the hook 33 for a thin plate (holding surface 33a) grips and fixes with the back face 11b of the first wall 11 therebetween the angle R1a of the rack R1 which is located in an area closer to the outer side than the center of the bracket 1, as illustrated in FIG. 7A and FIG. 7B. At this time, the hook 33 applies a pressure in such a way as to push the angle R1a onto the back face 11b. The protrusion 25 of the rotating member 20 engages with one of the protrusions 15 such that the rotating member 20 or the like is prevented from excessively rotating to release the fixing. The rack R1 is fixed to the bracket 1 with two attachments through the temporal fixing by way of inserting the protrusion 13 into the fastening hole H, and the final fixing by way of gripping by the hook 33 and the back face 11b. Since the bracket 1 is fastened to the optical unit P with the screw, the optical unit P is fixed to a predetermined location of the rack R1 through fixing of the bracket 1 to the rack R1. The hook 34 not used for fixing at this time is rotated toward the inner side to be housed in the cutout 12b of the second wall 12.

Figure 8:
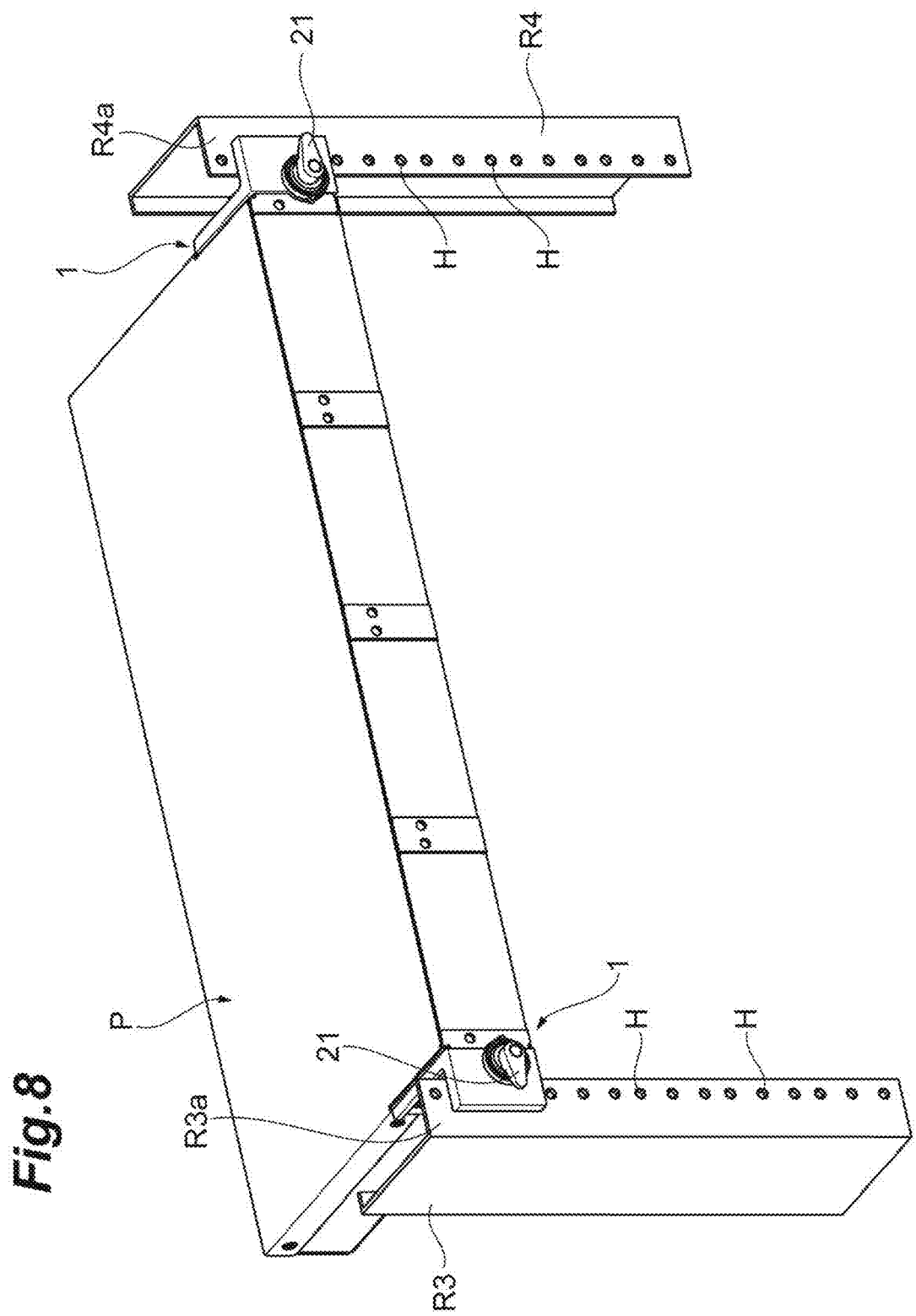
FIG. 8 is a perspective view illustrating a state where the optical panel is attached to a pair of racks with a pair of brackets (a second locking position) according to an embodiment.

In a case where the angle of the rack is a thick plate, after completion of the temporal fixing of the bracket 1 to angles R3a and R4a of racks R3 and R4, the handles 21 of the fasteners S are rotated 90° toward the outer side, as illustrated in FIG. 8. By doing so, the rotating members 20 and 30 also rotate 90° in conjunction with motions of the handle 21, and then, the hook 34 for a thick plate (holding surface 34a) grips and fixes with the back face 11b of the first wall 11 therebetween each of the angles R3a and R4a of the racks R3 and R4 which is located in an area closer to the outer side than the center of the bracket 1. At this time, the protrusion 25 of the rotating member 20 engages with the other of the protrusions 15 such that the rotating member 20 or the like is prevented from excessively rotating toward an opposite to release the fixing. The hook 33 not used for fixing at this time is rotated toward the inner side to be housed in the cutout 12b of the second wall 12.

As described above, the bracket 1 according to the embodiment of the disclosure is provided with the protrusion 13 which is inserted into the fastening hole H provided to the rack to temporarily fix the optical unit P to the rack, and the back face 11b of the first wall 11 of the bracket body 10 and the holding surfaces 33a and 34a of the hooks 33 and 34 of the fastener S, the back face 11b and the holding surface 33a or 34a being capable of gripping and fixing the angle of the rack therebetween. Then, according to the bracket 1, the angle of the rack can be easily gripped between the back face 11b and the holding surface 33a or 34a by inserting the protrusion 13 into the fastening hole H of the rack and thereafter, rotating the fastener S from the initial position to the locking position. According to the bracket 1 like this, without the need to attach the bracket to the rack by fastening with the screw or the like, the optical unit P can be attached to the rack with a relatively easy operational rotating operation, and therefore, a time taken for the attaching work can be reduced.

In the embodiment, the fastener S has the handle 21 which is provided adjacent to the front face 11a of the first wall 11 and configured to rotate the fastener S. Since the handle 21 is included, the rotating operation of the fastener S can be easily made. The bracket 1 further comprises the elastic member 40 arranged between the handle 21 and the bracket body 10. By providing the elastic member 40 (O-ring) between these parts, a biasing force can be provided to the grip of the rack by the back face 11b and the holding surface 33a or 34a, which allows the optical unit P to be more reliably fixed to the rack.

In the embodiment, the fastener S has the rotating member 20 having the handle 21 configured to rotate the fastener and provided adjacent to the front face 11a, and the rotating member 30 having the hooks 33 and 34 and provided adjacent to the back face 11b. By configuring the fastener S with different members such as the rotating members 20 and 30, the attachment configuration of the fastener S to the bracket body 10 can be simplified.

In the embodiment, the fastener S has two hooks 33 and 34, and the hook 34 is provided at a position different from the hook 33 in the rotation axis of the fastener S. By the hooks 33 and 34 provided at the different positions, the bracket 1 can correspond to the angles of the plates having different plate thicknesses.

In the embodiment, the fastener S further has the main body 31 on the outer periphery of which the hooks 33 and 34 are provided, and the hooks 33 and 34 are arranged opposite to each other in the circumferential direction of the main body 31. In this case, for example, the operation method can be easily achieved such as that the fastener is rotated to the first rotation direction to fix the angle by the hook 33 in the case where the bracket is fixed to the rack having the first plate thickness, and the fastener is rotated inversely to the second rotation direction to fix the angle by the hook 34 in the case where the bracket is fixed to the rack having the second plate thickness.

In the embodiment, the bracket body 10 has the second wall 12 including the hole 12a for fixing the bracket body to the optical unit P. The second wall 12 is provided with the cutout 12b. The hook 34 may be housed in the cutout 12b when the fastener S is rotated from the initial position to the locking position by way of the hook 33. Inversely, the hook 33 may be housed in the cutout 12b when the fastener S is rotated from the initial position to the locking position by way of the hook 34. According to this configuration, the hook which is not used for locking on the rack can be housed, making an entire configuration of the bracket 1 more compact.

In the embodiment, the bracket body has the second wall 12 including the structure for fixing the bracket body to the optical unit P. Since the lateral face of the optical unit P is fixed to the bracket 1 by the second wall 12, fixing between the optical unit P and the bracket 1 can be made stronger.

In the embodiment, the protrusion 13 is provided on the first wall 11 to be located more upward than the hole 11c for passing the fastener S therethrough. By arranging the protrusion 13 upward which is inserted into the hole H of the rack for the temporary fastening, the bracket 1 when temporarily fixed is unlikely to fall from the rack, further facilitating fixing the bracket 1 to the rack.

According to the optical unit with bracket to which a pair of brackets in the embodiment are attached in advance, it is possible to more easily attach the optical unit to the rack.

Figure 9:
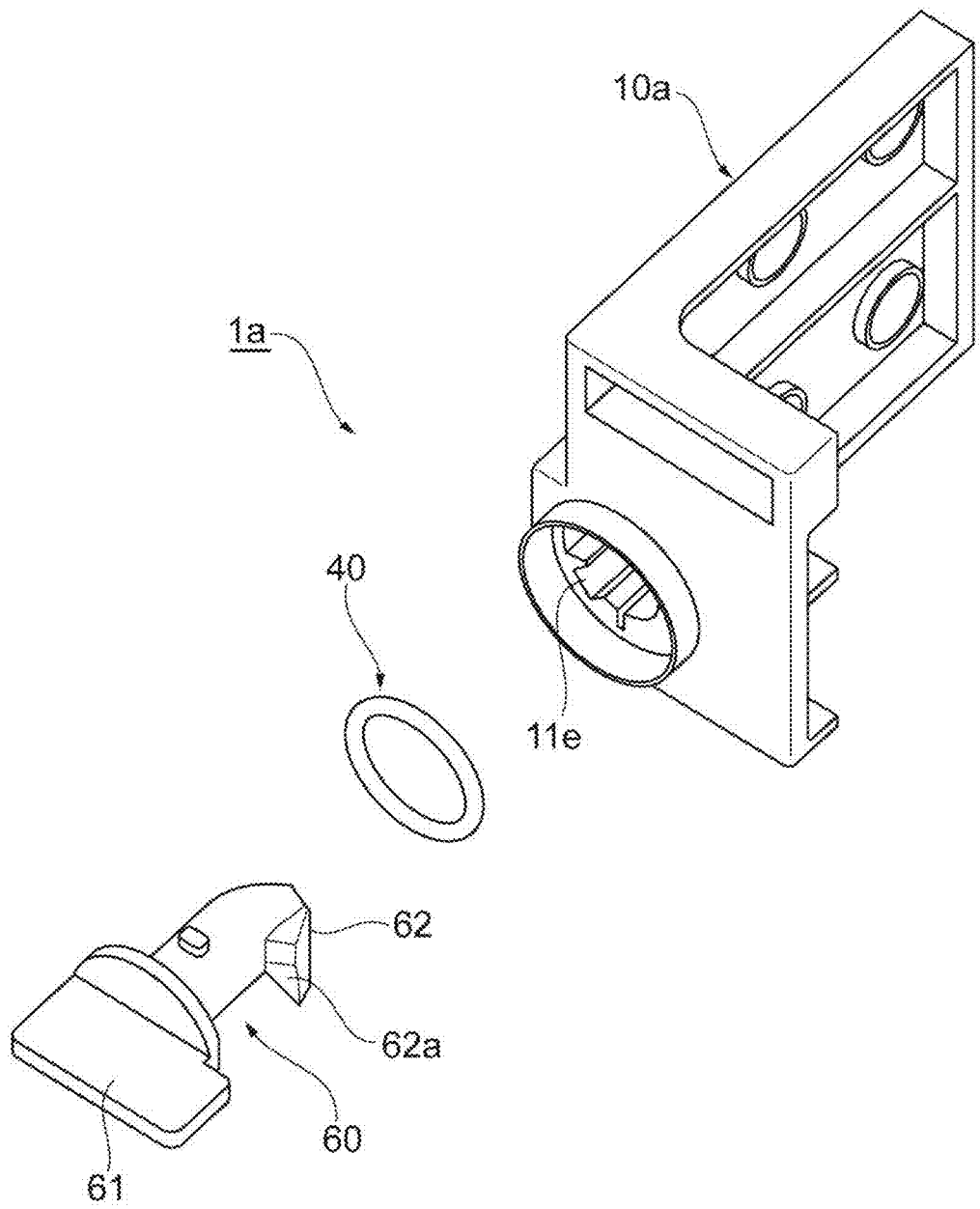
FIG. 9 is an exploded perspective view of a bracket according to a modification example.

As described above, the bracket according to the embodiment and the optical unit with bracket are described, but the invention is not limited thereto and various modifications can be applied. For example, the bracket according to the above embodiment is described for the bracket which can correspond to two types of the cases of the thin and thick angles of the rack, but a bracket 1a corresponding to one type of thickness of the angle may be used as illustrated in FIG. 9. A fastener (rotating member 60) of the bracket 1a is provided with one hook 62 having a holding surface 62a. A projecting direction of the hook 62 is the same as an extending direction of a handle 61, and therefore, an intuitive operation can be made similar to the above embodiment. Although the FIG. 9 illustrates an example in which the fastener is constituted by one member, the fastener may be constituted by a plurality of members or a single member, as described in the above embodiment. Even in a case of the example illustrated in FIG. 9, the rotating member 60 is caused to pass through a through-hole 11e of an angle main body 10a to fix the angle by the holding surface 62a, and then, the optical unit P is fixed to the rack.

REFERENCE SIGNS LIST

1 . . . bracket; 10, 10a . . . bracket body; 11 . . . first wall; 11a . . . front face; 11b . . . back face; 11c, 11e . . . through-hole; 11d . . . groove; 12 . . . second wall; 12a . . . hole; 12b . . . cutout; 13 . . . protrusion; 14 . . . annular body; 15 . . . protrusion; 20 . . . rotating member; 21 . . . handle; 22 . . . circular plate portion; 23 . . . key; 24 . . . through-hole; 25 . . . protrusion; 30 . . . rotating member; 31 . . . main body; 32 . . . catching portion; 33, 34 . . . hook; 33a, 34a . . . holding surface; 35 . . . groove; 38 . . . protrusion; 40 . . . elastic member; 50 . . . screw; 60 . . . rotating member; 61 . . . handle; 62 . . . hook; 62a . . . holding surface; A1 . . . LC adapter; A2 . . . MPO adapter; C1 . . . LC connector; C2 . . . MPO connector; F . . . optical fiber; H . . . fastening hole; M . . . optical connector module; P . . . optical unit (optical panel); P1, P2, P3, P4 . . . window; R1, R2, R3, R4 . . . rack; R1a, R2a, R3a, R4a . . . angle; S . . . fastener

What is claimed is:

1. A bracket for attaching an optical unit to a rack, the bracket comprising:
a bracket body having a first wall including a first face and a second face opposite to the first face, and a protrusion extending in a direction intersecting with the first wall from the second face against the first face, the bracket body being provided with a hole penetrating through the first wall from the first face to the second face; and
a fastener arranged to pass through the hole on the first wall and configured to be rotatable with respect to the first wall, the fastener having a first hook including a holding surface substantially parallel to the second face,
wherein the holding surface of the first hook faces the second face to define a first gap between the holding surface of the first hook and the second face of the first wall at least when the fastener rotates from an initial position to a first locking position.

2. The bracket according to claim 1,
wherein the fastener has a handle provided adjacent to the first face of the first wall and configured to rotate the fastener, and
wherein the bracket further comprising an elastic member arranged between the handle and the bracket body.

3. The bracket according to claim 1,
wherein the fastener has
a first rotating member having a handle configured to rotate the fastener and provided adjacent to the first face, and a second rotating member having the first hook and provided adjacent to the second face, and wherein the first rotating member is attached to the second rotating member such that the first rotating member and the second rotating member integrally rotate.

4. The bracket according to claim 1, wherein the fastener further has a second hook including a holding surface substantially parallel to the second face, the second hook being provided at a position different from the first hook in a direction along a rotation axis of the fastener, and wherein the holding surface of the second hook faces the second face to define a second gap between the holding surface of the second hook and the second face of the first wall at least when the fastener rotates from an initial position to a second locking position.

5. The bracket according to claim 4, wherein a length of the first gap is shorter than a length of the second gap in the direction along the rotation axis.

6. The bracket according to claim 4, wherein the fastener further has a cylindrical portion, the first hook and the second hook being provided on an outer periphery of the cylindrical portion, and the first hook and the second hook being arranged opposite to each other in a circumferential direction of the cylindrical portion.

7. The bracket according to claim 4, wherein the bracket body has a second wall including a structure for fixing the bracket body to the optical unit, the second wall being provided with a cutout, and wherein the second hook is housed in the cutout when the fastener rotates from the initial position to the first locking position, or the first hook is housed in the cutout when the fastener rotates from the initial position to the second locking position.

8. The bracket according to claim 1, wherein the bracket body has a second wall including a structure for fixing the bracket body to the optical unit.

9. The bracket according to claim 8, wherein the first wall is contiguous to the second wall such that a direction of the first wall spreading intersects with a direction of the second wall spreading.

10. The bracket according to claim 1, wherein the protrusion is provided on the first wall to be located more upward than the hole for passing the fastener therethrough.

11. An optical unit with bracket comprising:

at least one bracket according to claim 1 and an optical unit having a plurality of optical fibers housed therein, wherein the bracket body is fixed to the optical unit.

* * * * *